(12) United States Patent
Weber et al.

(10) Patent No.: US 8,220,155 B2
(45) Date of Patent: Jul. 17, 2012

(54) METHOD FOR MANUFACTURING A THREE DIMENSIONAL FRAME STRUCTURE FOR USE AS A CORE STRUCTURE IN A SANDWICH CONSTRUCTION

(75) Inventors: Hans-Jürgen Weber, Verden (DE);
Gregor Christian Endres, Pfaffenhofen (DE)

(73) Assignee: Airbus Operations GmbH, Hamburg (DE)

( * ) Notice: Subject to any disclaimer, the term of this patent is extended or adjusted under 35 U.S.C. 154(b) by 999 days.

(21) Appl. No.: 12/197,037

(22) Filed: Aug. 22, 2008

(65) Prior Publication Data
US 2009/0049693 A1 Feb. 26, 2009

Related U.S. Application Data

(63) Continuation of application No. PCT/EP2007/001549, filed on Feb. 22, 2007.

(60) Provisional application No. 60/776,524, filed on Feb. 24, 2006.

(30) Foreign Application Priority Data

Feb. 24, 2006 (DE) .................. 10 2006 008 728

(51) Int. Cl.
*B21D 53/88* (2006.01)
(52) U.S. Cl. .............................. 29/897.2; 29/897; 29/521
(58) Field of Classification Search ................. 29/897.2, 29/432, 432.1, 505, 521, 897, 897.312; 428/116–118, 205–207; 442/6, 16, 32, 52
See application file for complete search history.

(56) References Cited

U.S. PATENT DOCUMENTS 3,884,646 A 5/1975 Kenney
(Continued)

FOREIGN PATENT DOCUMENTS

JP 9206954 8/1997
(Continued)

OTHER PUBLICATIONS

Russian Notice of Allowance for Russian Application No. 2008137943/02(048871) mailed Jan. 20, 2011.
(Continued)

*Primary Examiner* — David Bryant
*Assistant Examiner* — Ryan J Walters
(74) *Attorney, Agent, or Firm* — Ingrassia Fisher & Lorenz P.C.

(57) ABSTRACT

A method is provided for manufacturing a three dimensional frame structure that can be used as a core structure in a sandwich construction. Furthermore, a frame structure is provided for a sandwich construction, which frame structure has been manufactured in accordance with the method. In the method, a two dimensional lattice structure is made from bar-shaped linear semi finished products, in which structure the semi finished products intersect at defined points of intersection; the bar-shaped linear semi finished products are connected at the points of intersection and are softened by locally applying heat to the lattice structure in each case along three non-intersecting (imaginary) straight lines. In order to impart a three dimensional shape to the lattice structure a force (F) is introduced into the lattice structure along the middle one of the (imaginary) straight lines to which heat has been applied, wherein, as a result of deformation of the lattice structure, the introduced force F is deflected into pairs of tensile forces acting in the semi finished products, as a result of which the lattice structure is pulled into a third dimension, along the middle (imaginary) straight line to which heat has been applied.

14 Claims, 5 Drawing Sheets

U.S. PATENT DOCUMENTS

| | | | |
|---|---|---|---|
| 4,530,197 A | | 7/1985 | Rainville |
| 5,114,776 A | * | 5/1992 | Cesaroni ................ 428/131 |
| 5,527,590 A | | 6/1996 | Priluck |
| 6,976,724 B2 | * | 12/2005 | Wheatley ............. 296/100.16 |
| 2002/0170941 A1 | | 11/2002 | Wallach et al. |
| 2003/0029120 A1 | | 2/2003 | Sacks |
| 2005/0202206 A1 | | 9/2005 | Wadley et al. |
| 2006/0163319 A1 | | 7/2006 | Ervin et al. |

FOREIGN PATENT DOCUMENTS

| | | |
|---|---|---|
| RU | 2036287 C1 | 5/1995 |
| SU | 1368405 A1 | 7/1986 |
| WO | 03101721 A1 | 12/2003 |
| WO | 2004022869 A2 | 3/2004 |

OTHER PUBLICATIONS

European Patent Office, Communication pursuant to Article 94(3) EPC, dated Mar. 12, 2009 for European Application No. 07 703 540.0-2302.

European Patent Office, Communication under Rule 71(3) EPC, dated Feb. 4, 2011 for European Application No. 07 703 540.0-2302.

European Patent Office, Decision to grant a European patent pursuant to Article 97(1) EPC, dated Jun. 24, 2011 for European Application No. 07 703 540.0-2302 / 1986803.

* cited by examiner

METHOD FOR MANUFACTURING A THREE DIMENSIONAL FRAME STRUCTURE FOR USE AS A CORE STRUCTURE IN A SANDWICH CONSTRUCTION

CROSS-REFERENCE TO RELATED APPLICATIONS

This application claims priority to International Application No. PCT/EP2007/001549, filed Feb. 22, 2007, which was published under PCT Article 21(2) and which claims priority to German Application No. 102006008728.3, filed Feb. 24, 2006 and of U.S. Provisional Patent Application No. 60/776,524 filed Feb. 24, 2006, which are all hereby incorporated in their entirety by reference.

TECHNICAL FIELD

The present invention relates to the technical field of composite materials. In particular, the invention relates to a method for manufacturing a three dimensional frame structure that can be used as a core structure in a sandwich construction. Furthermore, the invention relates to a frame structure for a sandwich construction, which frame structure has been manufactured in accordance with the method according to the invention, and to an aircraft comprising a structural component in the form of a sandwich construction, whose core structure has been made with the use of the method according to the invention.

BACKGROUND

Due to their good ratio of rigidity or strength to density, composite materials, and in particular sandwich constructions, have a wide range of applications in the field of aircraft construction. Generally speaking, sandwich constructions are made from a top and a bottom cover layer, between which, for the purpose of enhanced rigidity, there can be a honeycomb-like core structure, for example made of vertically extending cells of hexagonal cross section.

As an alternative to the design involving honeycomb structures, rigid cellular materials can be used. However, sandwich constructions comprising a rigid cellular material core are to some extent associated with a disadvantage in that, when compared to sandwich constructions with a honeycomb core structure and comparable density, their mechanical characteristics are inferior. In order to compensate for this, fibers, threads or protruded semi-finished frame products can be incorporated in the rigid cellular material at defined angles and at a defined density. In the case of fibers or threads and a subsequent resin infiltration process, the fibers then contribute to the mechanical reinforcement of the cellular material. In this case the cellular material not only acts as a carrier that holds the pins in the form of the resin-reinforced fibers or threads in position, but also serves to stabilize the pins in order to prevent or at least delay any buckling or collapsing of said pins when under load.

However, since the load-bearing capacity of such reinforced rigid cellular materials is decisively determined by the introduced pins or by introduced protruded semi-finished frame products, as a rule the existing cellular core in an undesirable manner tends to contribute to an increase in the density of the core structure. Furthermore, as a rule, a strengthened cellular material structure comprises only a small region in which it is elastic under load so that as a rule damage to the composite material tends to be plastic and permanent. Lastly, aeration or dewatering of a sandwich structure with a reinforced rigid cellular material is not possible because the space between the cover layers is completely filled by the rigid cellular material.

From WO 2004/022869 A2 and WO 03/101721 A1, for example, methods for manufacturing a three dimensional lattice structure are known, in which methods at first metallic lattice structures are generated which by means of a bottom die and an associated upper die are bent to the third dimension so that a three dimensional latticework is created. During such bending, the lateral border of the metallic lattice mat is not held in place because this would prevent any bending to the third dimension. However, such bending with the use of a bottom die and associated top die is comparatively inflexible, because varying the latticework angle and varying the height of the latticework requires a change of the bottom die and of the associated upper die.

U.S. Pat. No. 3,884,646 also describes a manufacturing process for a three dimensional latticework for use in a sandwich construction as a core structure. In this method, first a flat lattice structure is formed from a metal sheet, which lattice structure is subsequently bent, again by means of a forming process, by means of a bottom die and associated upper die, in order to impart a three dimensional shape to said flat lattice structure.

While the three dimensional lattice structures manufactured according to the above-mentioned printed publications are not associated with the disadvantages of cellular-material-reinforced core structures as explained above, the manufacturing methods, as explained, for manufacturing three dimensional lattice structures are comparatively inflexible due to the use of a bottom die and upper die.

Among other things there may be a need to state a method for manufacturing a three dimensional frame structure without the use of a carrier material, for example in the form of a rigid cellular material, wherein the frame structure in relation to producing various lattice geometries is more flexible than the described forming methods using a bottom die and upper die. In addition, other objects, needs, desirable features, and characteristics will become apparent from the subsequent detailed description and the appended claims, taken in conjunction with the accompanying drawings and this background.

SUMMARY

If within the context of the description the term "bar-shaped linear semi finished product" is used, this refers to protruded, extruded or drawn bar-shaped geometries of a defined cross section, which cross section can, for example, be round, triangular, rectangular, hexagonal, tubular or of some comparable geometric shape. The semi finished products can be made with or without reinforcement fibers for reinforcement. The semi finished products can, for example, comprise extruded thermoplastics; protruded (partially cross linked) polymers, in particular thermoset plastic materials or duromers; protruded metals or ceramics, in particular precursor ceramics, wherein the thermoplastics or thermoset plastic materials (duromers) can additionally comprise reinforcement fiber.

According to a first embodiment of the present invention, the object of the invention can be met by a method for manufacturing a three dimensional frame structure, in which method in a first step a two dimensional lattice structure made of bar-shaped linear semi finished products is manufactured. In this method, the linear semi finished products can be provided as a continuous material. In this process the linear semi finished products are arranged to form a two dimensional lattice structure such that they intersect at defined points of intersection. For example, initially a first layer of linear semi finished products can be arranged, in which layer the individual bar-shaped semi finished products extend in groups, parallel in relation to each other. Subsequently a second layer of linear semi finished products that extend in groups, parallel in relation to each other, can be placed onto the first layer, wherein the linear semi finished products are aligned at a different angle than in the first layer so that the linear semi finished products of the two layers intersect at defined points of intersection. The lattice structure formed from bar-shaped semi finished products that initially are not linked to each other can comprise an even pattern, but this is not compulsory. In a further process step, subsequently the bar-shaped linear semi finished products are interconnected at the points of intersection. Such connecting can, for example, take place by point-contact heating in the region of the points of intersection so that the semi finished products soften and slightly adhere to each other. In a further subsequent method-related step, the bar-shaped linear semi finished products are then softened so that they become somewhat tacky or sticky. Such softening can, for example, take place by locally applying heat to the lattice structure, along three imaginary non-intersecting straight lines. Applying heat to the two dimensional lattice structure can, for example, take place along a first group (of imaginary) non-intersecting straight lines, and correspondingly along a second group (of imaginary) non-intersecting straight lines, wherein the straight lines of the first group and the straight lines of the second group extend alternately to each other; in other words in each instance a straight line of the second group is situated between two straight lines of the first group, and a straight line of the first group is situated between two straight lines of the second group.

In order to subsequently impart the desired three dimensional structure to the lattice structure, a force is introduced into the lattice structure along the middle straight line of the imaginary straight lines to which heat has been applied so that the lattice structure deforms out of its two dimensional plane. As a result of such deformation of the lattice structure, the introduced force is deflected into pairs of tensile forces acting in the semi finished products, as a result of which the lattice structure is pulled into a third dimension, along the middle imaginary straight line to which heat has been applied. This step quasi involves a deep drawing process in which the material of the semi finished products is not elongated. Instead, the lattice structure shortens in the plane as a result of deformation into the third dimension. To prevent the lattice structure from deviating at random when force is introduced, the borders of the lattice structure or the straight line flanking the middle straight line can be held by movable bearings, which ensures that the introduced force can convert or disaggregate in a targeted manner to tensile forces in the semi finished products.

In the step in which a force is introduced into the lattice structure the two dimensional lattice structure is thus deformed into a three dimensional folded structure by the successive and alternating forming of peaks and troughs. In this arrangement the peaks are situated on the straight lines of the first group, while the deepest points of the troughs are situated on the straight lines of the second group. In this document any terminology reference to peaks and troughs relates to a cross sectional view of the three dimensional folded structure that is created, in which folded structure peaks and troughs are evident. In a perspective view, the peaks and troughs are elongated "mountain ranges" or ridges, with elongated "valleys" situated between them, when viewed in relation to the surface of the lattice structure. In this arrangement the peaks and troughs are created in that in the region of the straight line of the two groups of straight lines alternately a force is introduced into the lattice structure in the direction of the high points and low points to be produced. By introducing the force in the direction of the high points and low points to be produced, the two dimensional lattice structure deforms from the plane, as a result of which the abovementioned mountain ranges with the valleys in between are created along the straight lines of the two groups of straight lines. As a result of a force being exerted onto the semi finished products of the lattice structure, along the straight line of the two straight groups, the two dimensional lattice structure deforms from the plane, as a result of which the peaks and troughs are created in the desired manner. It should be clarified that any reference to a force being introduced into the lattice structure "along" a straight line means that a force is applied to the lattice structure in an essentially perpendicular manner, which force is distributed along the straight line.

In order to optimally implement the method in relation to the time taken, connecting the bar-shaped linear semi finished products at the points of intersection, softening the bar-shaped linear semi finished products, as well as introducing the force can be carried out in a continuously flowing process in which the above steps are implemented in a continuous process that is repeated, progressing in a direction of production. In particular, it may be expedient if connecting the bar-shaped linear semi finished products takes place while said products are being softened, because these products become somewhat tacky (i.e., slightly sticky), as a result of such softening, so that the semi finished products that are placed one onto the other easily adhere to each other. Of course, this makes it necessary that softening of the bar-shaped linear semi finished products takes place in the region of the points of intersections so that the bar-shaped linear semi finished products connect to each other in these regions. The continuous repeated production process is wherein in a direction of production, in a continuous process, heat is applied to further imaginary straight lines of the lattice structure, and force is applied, along these straight lines, for the purpose of deforming the lattice structure.

In order to still further optimize the manufacturing process; the application of force can take place while heat is applied to the lattice structure along the three non-intersecting straight lines. As a result of this application of heat, plastic deformation of the lattice structure along the above-mentioned straight line can take place in a targeted manner as a result of the introduction of force.

Since for reasons relating to statics and to construction it can be desirable if the point of intersections of the bar-shaped linear semi finished products in the third dimension form the outer border of the three dimensional frame structure to be produced, the application of heat can take place such that heat is always applied at the same time to the points of intersection that are situated so as to be perpendicular in relation to the direction of production. These points of intersection that are situated so as to be perpendicular in relation to the direction of production are adjacent points of intersection at which various linear semi finished products of the lattice structure intersect. Since the force introduction into the lattice structure always takes place along a middle one of three straight lines, to which straight lines heat has been applied on the lattice structure, as a result of the introduction of force and as a result of the deflection of force due to deformation of the lattice structure into pairs of tensile forces acting in the semi finished products, the intersection points to which heat has been applied are thus drawn into the desired third dimension, with the intersection points thus forming the outer border of the three dimensional frame structure in the third dimension.

As has already been mentioned, connecting the bar-shaped linear semi finished products at the points of intersection can take place during, and as a result of, the concurrent application of heat to the points of intersection which are situated so as to be perpendicular to the direction of production. This is expedient in particular in cases where the application of heat is such that heat is applied concurrently to points of intersection that are situated so as to be perpendicular in relation to the direction of production, because in this way the linear semi finished products in the individual layers become soft in the region of the points of intersection, and as a result of their touching—and if applicable as a result of a corresponding application of force (for example gravitational force)—are connected to each other.

According to a particular embodiment of the present invention, a three dimensional folded structure can be created in that in the continuous and recurring process, sequentially, forces are introduced into the lattice structure along each second imaginary straight line, to which straight line heat has been applied, which forces pull the semi finished products into the third dimension to a desired depth. In this process the plane of the lattice structure deforms such that the two straight lines, which flank the middle straight line to which heat has been applied, approach each other in the plane, as a result of which a folded structure is generated which when viewed in cross section has a concertina shape. Of course it is also possible to subject the lattice structure to force in a positive direction of the third dimension along every second straight line to which temperature has been applied, whereas every first, third, fifth etc., straight line to which heat has been applied is also subjected to a force in a negative direction of the third dimension, wherein again a zig-zag-shaped folded structure can be created.

When compared to the known methods using bottom die and upper die forming tools, the method according to the one or more embodiments of the invention is very flexible because as a result of the force introduction along the straight line to which heat has been applied any desired individual thickness or strength of the three dimensional frame structure can be produced. For example, the force and the heat can be applied to the semi finished products by means of a heatable edge that can be moved into the third dimension, wherein, depending on the depth to which the edge is moved into the depth of the third dimension, a variable thickness of the frame structure can be produced. Thus, for example, the thickness of the three dimensional frame structure can continuously be changed in that at different locations of the lattice structure the edge is moved to a different extent into the third dimension for the purpose of deforming the lattice structure.

In order to ensure a reliable connection of the bar-shaped linear semi finished products at the points of intersection, the force can be introduced already during the application of heat for softening the bar-shaped linear semi finished products along the points of intersection situated so as to be perpendicular in relation to the direction of production so that in the region of the points of intersection small areas of pressed material on the linear semi finished products occur, which as a positive side effect can result in enhanced foldability of the semi finished products at these positions.

In the above passages, a method for manufacturing a three dimensional frame structure has been described in which the straight lines, along which the two dimensional lattice structure is folded, generally speaking do not intersect. However, in order to produce a three dimensional lattice structure that is as regular as possible, it is of course also possible to apply heat to the lattice structure along parallel (imaginary) straight lines, and to introduce the force to the lattice structure at the aforementioned straight lines.

In order to facilitate deformation of the two dimensional lattice structure to the third dimension, in a further step preforming indentations can be impressed into the semi finished products along the straight line to which heat has been applied, in the direction of the forming that is to be produced later, in the direction of the third dimension. Such impression of preforming indentations can take place in a completely separate step by means of an edge-shaped impression tool that has been specially provided for this purpose; as an alternative to this, the preforming indentations can also be impressed into the semi finished products by means of the movable and heatable edge. Since the bar-shaped linear semi finished products intersect in the individual layers at the points of intersection so that at these positions the material thickness is quasi double, by means of impressing preforming indentations in the region of the points of intersection these thickened parts can be reduced, or in the case of thermoplastic semi finished products can even be removed altogether. In particular, welding methods for joining can also be used in the case of thermoplastic semi finished products.

In order to increase the moment of resistance of the three dimensional frame structure produced in this way so that said frame structure reacts less sensitively in relation to bending deformation, in a further method-related step cover layers can be attached to, for example glued to, at least one side of the produced spatial frame structure, so that the cover layer abuts to the extremes, drawn into the third dimension, of the respective side of the frame structure. These cover layers thus absorb the compressive forces and tensile forces produced as a result of the application of bending moments so that the three dimensional frame structure itself does not deform, or deforms only slightly, when subjected to bending moments.

In order to render these cover layers insensitive in relation to shearing loads or the associated shearing deformation in relation to the three dimensional frame structure, and in particular in order to increase the shearing loads that can be transmitted, in addition to the above-mentioned attachment, the cover layers can be sewn to the extremes of the respective side of the frame structure by means of a sewing process, wherein in particular one-side sewing methods can be used. As an alternative, the cover layers can also be secured to the frame structure in that the teeth of a securing comb are pressed along its extremes through the frame structure into the cover layers, wherein the teeth are finally fixed in the cover layer as a result of a resin curing.

As shown in the above passages, with the method according to one or more embodiments of the invention, for manufacturing a three dimensional frame structure, compared to the design of a core structure with the use of rigid cellular materials, a reduction in the core structure densities can be achieved because in the method according to one or more embodiments of the invention there is no need to provide such rigid cellular materials. Furthermore, with the method according to one or more embodiments of the invention an open structure can be produced, which is characterized in that it drains easily (i.e., can be aerated or dewatered easily). Moreover, due to the open design of the structure, placing cables through the structure poses no problem without this involving any compromise to the mechanical integrity of said structure as a result of artificial channels.

When compared to core structures using rigid cellular materials, the three dimensional frame structure manufactured with the use of the method according to one or more embodiments of the invention further features a larger range of elastic deformation so that no plastic deformation damage, or only little plastic deformation damage, remains. Instead, when subjected to excessive loads, the individual bars in the form of the folded linear semi finished products can elastically collapse, as a result of which it becomes possible to achieve improved tolerance to damage.

Because in the method according to one or more embodiments of the invention it is possible to use protruded, extruded or continuously drawn geometric shapes of a defined cross section (triangular, quadrangular, hexagonal, hollow, tubular, round), construction engineers or designers have a further option of modifying the buckling behavior of the individual bars of the three dimensional frame structure so that by a targeted selection of defined frame geometries the characteristics of the core structure can be improved in a targeted manner.

Since the method can be implemented in a continuously flowing process, by changing the speed of extrusion or of drawing off by modifying the angles in the lattice structure, the formation of ramps, differences in density and thickness of the three dimensional frame structure can be achieved.

Because in the folding of the two dimensional lattice structure to a third dimension no bottom die and upper die arrangement as known from the state of art is used, the flexibility of the process can be enhanced because when a bottom die and upper die are used, both the bottom die and the upper die have to be changed in order to be able to vary the folding angle and the height of the structure. With the use of the method according to one or more embodiments of the invention such a change in the folding angle and in the structural height can be effected with the use of a heatable edge that can be moved to the third dimension, in that said edge is moved to different depths in the third dimension.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
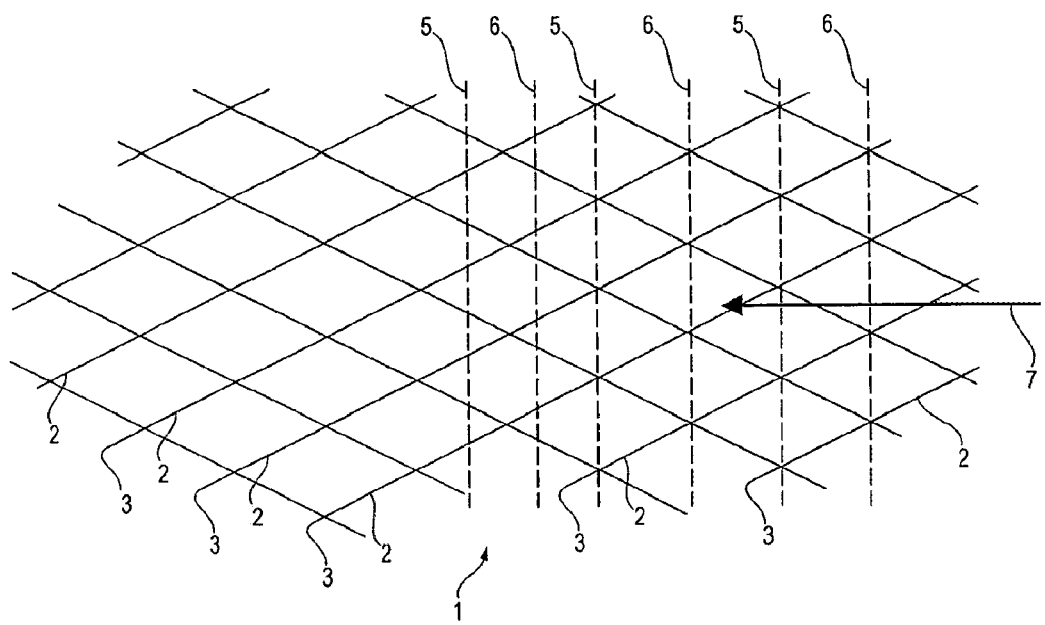
FIG. 1 shows a two dimensional lattice structure made of bar-shaped linear semi finished products.

FIG. 1 shows a two dimensional lattice structure 1 which in the exemplary embodiment shown in the diagram has been manufactured from two groups of linear semi finished products 2, wherein initially the first group 2 has been arranged so that the semi finished products extend at least substantially parallel and spaced apart from each other in a first layer. Subsequently a second group 3 of bar-shaped linear semi finished products 3 has been arranged on this first layer so that the individual bar-shaped linear semi finished products 3 of the second group extend on the first layer 2 in a second layer spaced apart and at least substantially parallel in relation to each other. As a result of this arrangement of the bar-shaped linear semi finished products of the first group 2 and of the second group 3, a two dimensional lattice structure 1 arises, in which the individual bar-shaped linear semi finished products of the two layers intersect at defined points of intersection 4.

The linear semi finished products can, for example, comprise protruded (partially cross linked) thermosetting plastic material, extruded thermoplastic material, continuously drawn protruded metal or ceramics, in particular precursor ceramics, wherein different cross-sectional geometries can be used.

In order to secure the shape of the lattice structure produced in this way for the subsequent forming step, the two layers 2, 3 of the bar-shaped linear semi finished products are interconnected at the points of intersection 4, which can, for example, take place by the application of heat and if applicable by the application of a corresponding force along the straight lines 5, 6 which in FIG. 1 are shown as dashed lines. In this arrangement the connection can be consecutive and sequential in the direction of production 7. In this process in the direction of production, consecutively, points of intersection 4, which extend on a straight line 5, 6 that is essentially perpendicular in relation to the direction of production 7, are at the same time subjected to heat. As a result of this application of heat the linear semi finished products are slightly heated at the points of intersection 4 so that they become slightly tacky, i.e. sticky, and thus interconnect.

In a further method-related step, subsequently the bar-shaped linear semi finished products 2, 3 can be softened in groups along three non-intersecting straight lines 5, 6, which can, for example, also take place by local application of heat to the lattice structure 1. Since the process of connecting the bar-shaped linear semi finished products at the points of intersection 4 can already take place with the application of heat, it may be expedient to combine both connecting and softening the bar-shaped linear semi finished products in one step so that correspondingly the lattice structure 1 is softened along three straight lines that in FIG. 1 are shown as dashed lines, which straight lines interconnect points of intersection 4 that extend so as to be perpendicular in relation to the direction of production 7.

Figure 2:
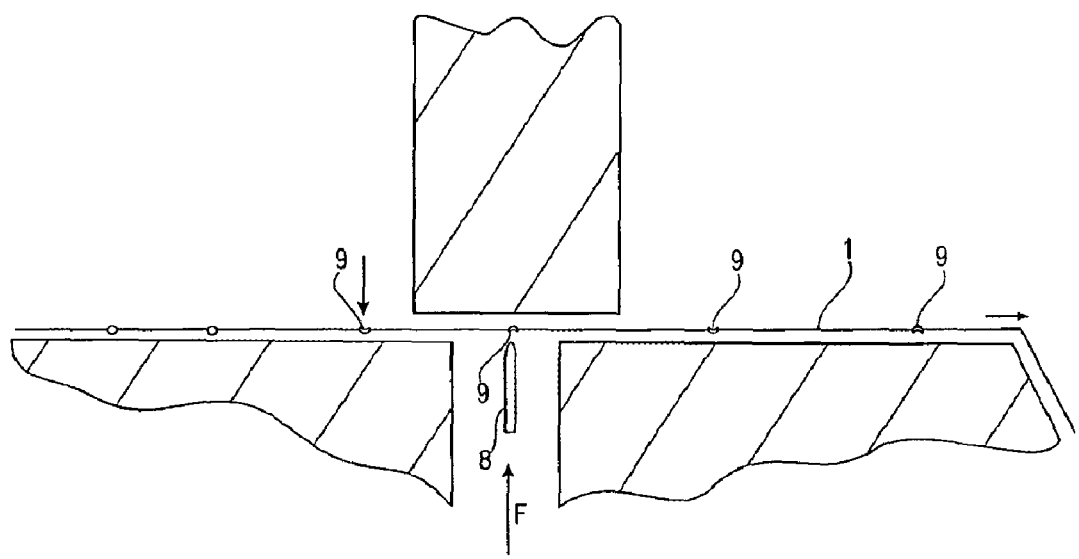
FIG. 2 explains the impression of preforming indentations into the semi finished products.

In order, in a later deformation step, to facilitate the forming of the lattice structure 1 in a third dimension, in an intermediate step preforming indentations can be impressed in the semi finished products 2, 3, as shown in FIG. 2. As shown in the diagram of FIG. 2, small indentations are impressed in the lattice structure 1, wherein the indentations 9 extend in that direction into which, later on, the lattice structure 1 is drawn into a third dimension. In this arrangement the indentations 9 are equally situated on the previously mentioned straight lines 5, 6, along which straight lines 5, 6 heat has been applied to the lattice structure 1 to soften the bar-shaped linear semi finished products 2, 3. Since softening of the bar-shaped linear semi finished products 2, 3 preferably takes place in such a way that heat can be applied to the region of the points of intersection 4 of these semi finished products 2, 3, as a result of the impression of the above-mentioned preforming indentations 9 a situation may be attained where thickened parts of material in the region of the points of intersection 4 can be reduced, or in the case of thermoplastic semi finished products can be removed altogether.

Figure 3:
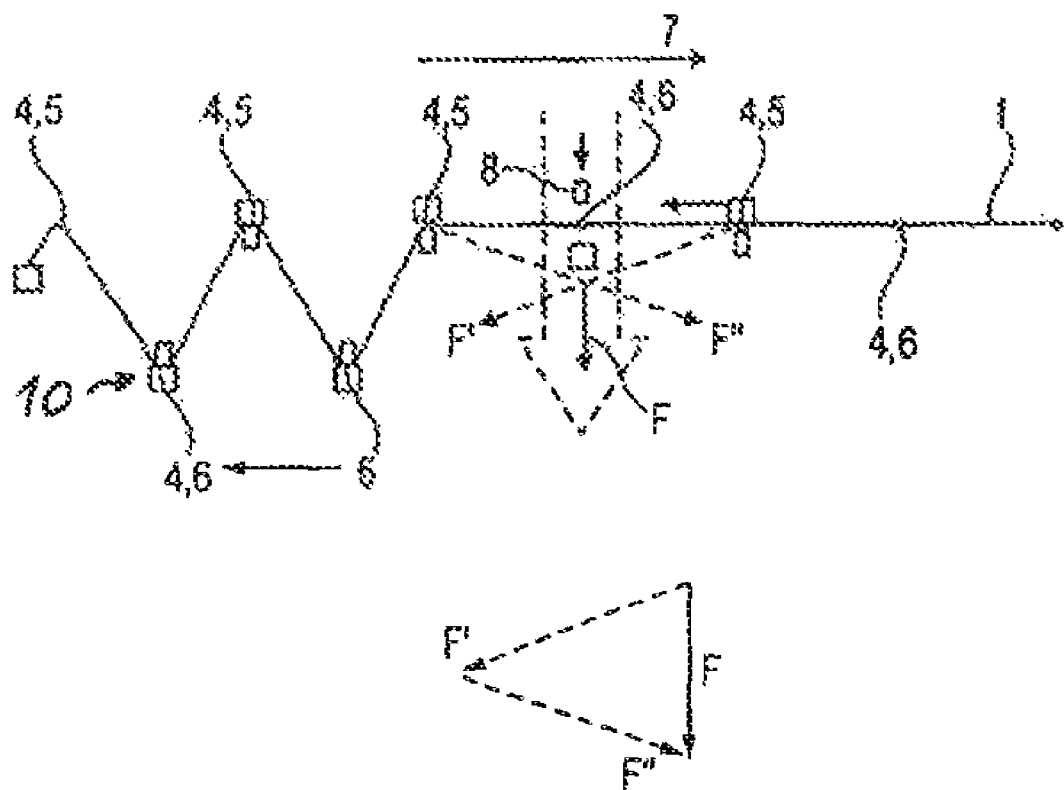
FIG. 3 illustrates the introduction of the forces into the lattice structure in order to pull this lattice structure into the third dimension.

As shown in FIG. 3, in a further method-related step a force F is introduced into the lattice structure 1 along the middle one of three imaginary straight lines to which heat has been applied, wherein the introduced force F causes deformation of the lattice structure 1 in a third dimension, which results in the introduced force F being deflected into pairs of forces, of tensile forces F' and F''' acting in the semi finished products, as indicated in the intermediate state of FIG. 3. Such disaggregation of forces or such deflection is graphically explained in the separate parallelogram of forces shown in FIG. 3. In this way tensile forces are thus introduced into the semi finished products, which tensile forces pull the lattice structure along the middle straight line, to which heat has been applied, into the third dimension.

As is further shown in FIG. 3, the lattice structure is jammed, along the desired straight lines 5, 6 that are later to represent the extremes of the three dimensional frame structure, between double beams 10 that can fulfill three types of function at the same time. Thus these double beams 10 can be adapted so as to be heatable and movable into the third dimension. In this way the individual layers of the bar-shaped linear semi finished products 2, 3 of the lattice structure 1 can be interconnected with the use of the double beams 10, provided said double beams 10 act on the lattice structure 1 along adjacent points of intersection 4. By heating the double beams 10, heat is thus applied to the lattice structure 1 or to the points of intersection 4, as a result of which the bar-shaped linear semi finished products 2, 3 soften in these positions and interconnect. This act of connecting the bar-shaped linear semi finished products 2, 3 at the points of intersection 4 can additionally be supported in that the double beams 10 are pressed together against each other, as a result of which in an advantageous manner undesirable thickened parts of material at the points of intersection 4 can be reduced. Furthermore, by this pressing together of the double beams 10, preforming indentations 9 can be impressed in the semi finished products in the direction of the forming, to be produced later, in the direction of the third dimension, which can facilitate forming due to the introduction of force into the lattice structure 1. In order to finally pull the lattice structure into the third dimension, by way of an edge 8, the double beam 10 can introduce a force into the lattice structure along the middle one of three straight lines 5, 6 to which heat has been applied so that the lattice structure 1 as a result of the previously explained force disaggregation deforms into the third dimension, as indicated in FIG. 3. In order to be able to actually generate defined tensile forces F', F''' during this force disaggregation in the direction of the semi finished products, the double beams 10 firmly clamp the lattice structure along two straight lines 5. However, in this arrangement the double beams 10 can be moved in the plane of the lattice structure 1 as indicated in FIG. 3 by arrows, so that as a result of the application of force F they move in the direction of the middle straight line 6, or are pulled in said direction. In this process the double beams 10 generate a counterforce to the displacement so that the tensile forces F' and F''' can be generated in a targeted manner.

As set out in the above explanations, connecting the bar-shaped linear semi finished products at the points of intersection 4, softening the bar-shaped linear semi finished products 2, 3, and introducing the force can take place in a common step with the use of the movable and heatable double beam arrangement 10, wherein the above-mentioned steps, when viewed in the direction of production 7, can be carried out consecutively and in a continuous repeating process.

The method according to one or more embodiments of the invention, in which a force F is introduced into the lattice structure 1 along a middle one of three straight lines 5, 6 to which heat has been applied, is characterized in particular by its flexibility in relation to known deformation processes using a bottom die and upper die. Thus, with this method, three dimensional frame structures of varying density and thickness can be manufactured in that the double beam arrangement 10 or the edge 8 is moved to a different depth in the third dimension, as a result of which process the thickness dimension of the three dimensional frame structure can be influenced. There is thus no need to elaborately exchange a bottom die and upper die arrangement in order to manufacture three dimensional frame structures of different depths.

Figure 4:
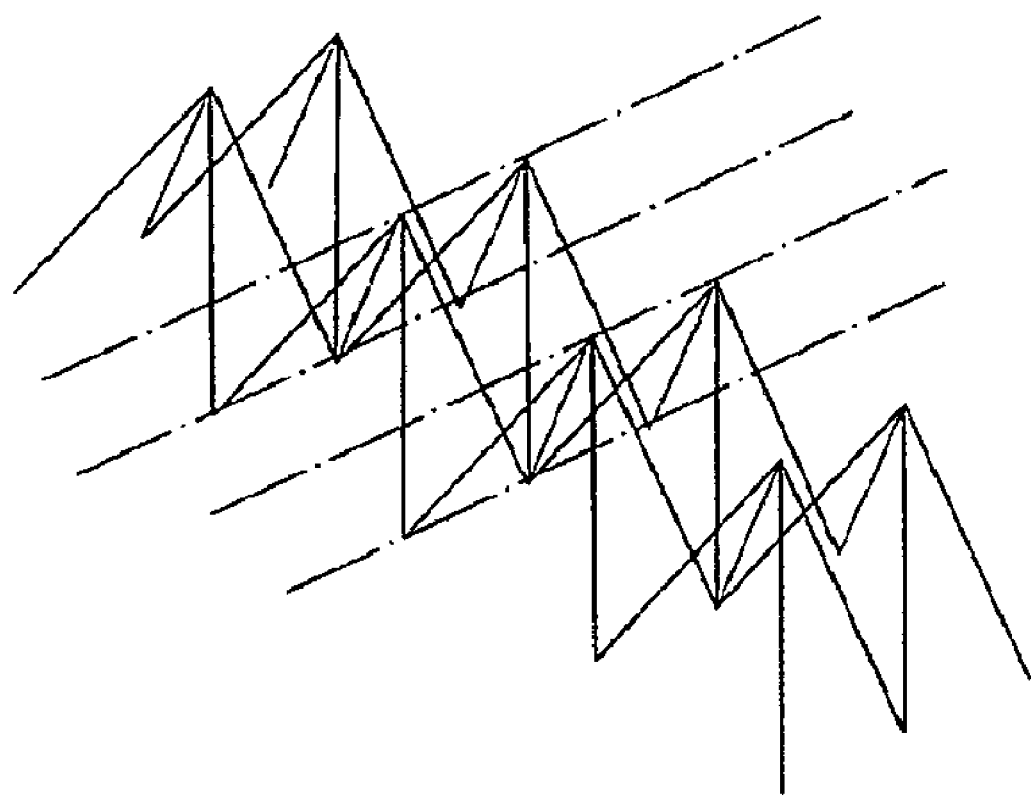
FIG. 4 shows the end product of a three dimensional supporting frame structure.

FIG. 4 shows the three dimensional frame structure manufactured with the use of the method according an embodiment of the invention. By means of the deformation of the two dimensional lattice structure 1 shown in FIG. 1, a periodically repeating spatial lattice structure can be generated that comprises a multitude of four-sided pyramids. In this arrangement the tips of the pyramids are formed by the points of intersection 4 of what formerly used to be the two dimensional lattice structure 1, which as a result of the application of heat and the introduction of force along adjacent points of intersection 4 after the deformation process form the extremes that laterally delimit the three dimensional frame structure. For illustration purposes FIG. 4 again shows the three straight lines 5, 6 along which the formerly two dimensional frame structure 1 has been softened at the points of intersection 4 by local application of temperature in order to, as a result of the introduction of force into the lattice structure along the middle one of the straight lines to which heat has been applied, pull the two dimensional lattice structure 1 into the third dimension.

Figure 5:
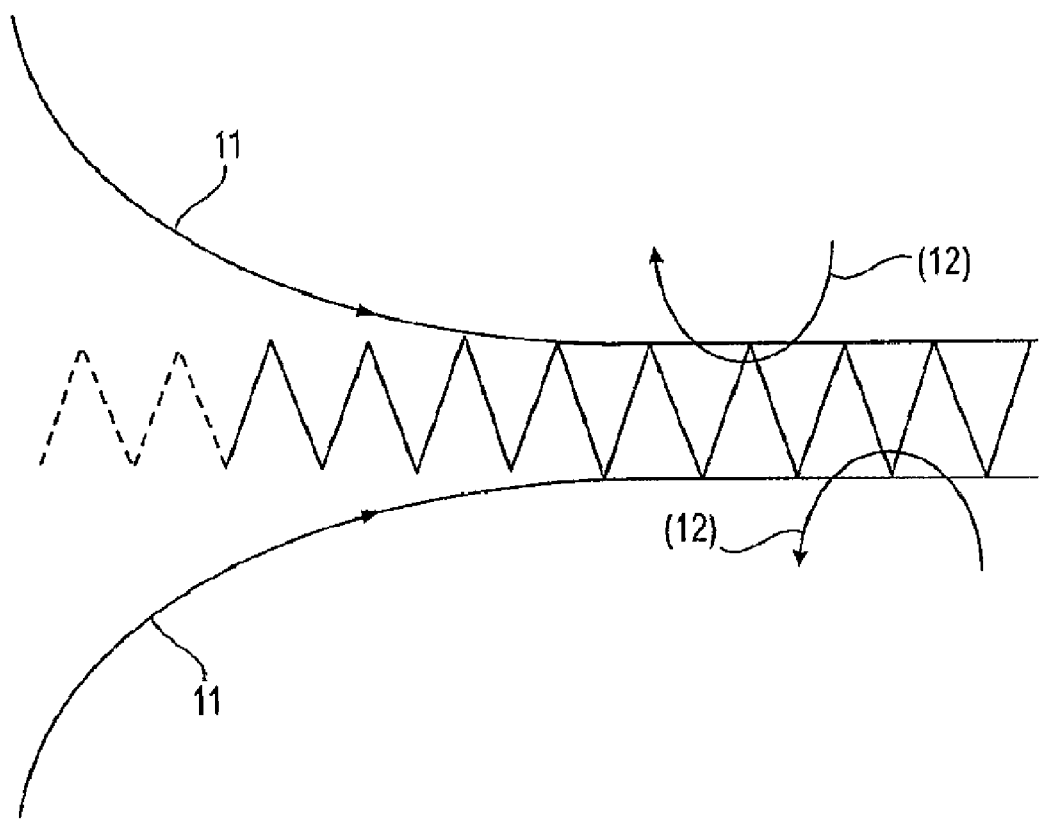
FIG. 5 explains the placement of cover layers onto the three dimensional frame structure.

FIG. 5 finally describes an optional method-related step in which, on both sides of the three dimensional frame structure produced, a cover layer 11 is applied so that it is supported at points by the produced tips of the pyramid. In order to attach the cover layers 11 to the three dimensional frame structure, the cover layers can be glued to the tips of the pyramids. However, since the adhesive surface at the tips of the pyramids is only small, the cover layers 11 at the extremes of the three dimensional frame structure in the form of the pyramid tips can additionally be sewn on, wherein preferably a one-side sewing method can be used, as shown in FIG. 5 by the diagrammatically indicated sewing stitches 12.

It should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations. Lastly, while at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:
1. A method for manufacturing a three dimensional frame structure, comprising the steps of:
   producing a two dimensional lattice structure from bar-shaped linear semi finished products intersecting at defined points of intersection;

connecting the bar-shaped linear semi finished products at the defined points of intersection;

softening the bar-shaped linear semi finished products by locally applying heat to the two dimensional lattice structure along each of three non-intersecting straight lines; and introducing a force into the two dimensional lattice structure along a middle one of the three non-intersecting straight lines to which heat is applied, wherein as a result of deformation of the two dimensional lattice structure, the force is deflected into pairs of tensile forces acting in the bar-shaped linear semi finished products, as a result of which the two dimensional lattice structure is pulled into a third dimension, along the middle line of the straight lines to which heat is applied.

2. The method of claim 1, wherein connecting the bar-shaped linear semi finished products at the defined points of intersection, softening the bar-shaped linear semi finished products, as well as introducing the force can be carried out in a continuous flow process in which the above steps are implemented in a continuous repeating process progressing in a direction of production.

3. The method of claim 1, wherein introducing the force takes place while heat is applied to the two dimensional lattice structure along the three non-intersecting straight lines.

4. The method of claim 1, wherein applying the heat takes place such that heat is applied at least substantially the same time to the defined points of intersection that are situated along a line that is at least substantially perpendicular in relation to the direction of production.

5. The method of claim 4, wherein connecting the bar-shaped linear semi finished products at the defined points of intersection takes place during, and as a result of, an at least substantially concurrent application of heat to the defined points of intersection which are situated along a line that is at least substantially perpendicular to the direction of production.

6. The method of claim 4, wherein connecting the bar-shaped linear semi finished products takes place at points of intersection in that the force is introduced during the applying of heat for softening the bar-shaped linear semi finished products along the points of intersection that are situated along a line that is perpendicular in relation to the direction of production.

7. The method of claim 1, wherein a three dimensional folded structure is created in that in a continuous repeating and sequential process, a force is introduced into the two dimensional lattice structure along each second straight line to which heat has been applied, which force pulls the bar-shaped linear semi finished products into the third dimension to a desired depth.

8. The method of claim 1, wherein the force and the heat can be applied to the bar-shaped linear semi finished products with a heatable edge that can be moved into a third dimension.

9. The method of claim 7, wherein the heatable edge is moved to a different depth in the third dimension for a purpose of creating a variable thickness of the three dimensional frame structure.

10. The method of claim 1, wherein the applying the heat to the two dimensional lattice structure takes place along at least substantially parallel straight lines.

11. The method of claim 1, further comprising the step of impressing preforming indentations into the bar-shaped linear semi finished products along one of the straight lines to which heat has been applied, in the direction of a forming that is to be produced later, in the direction of the third dimension.

12. The method of claim 1, further comprising the step of attaching cover layers to at least one side of the three dimensional frame structure so that a cover layer abuts to extremes, drawn into the third dimension, of a respective side of the three dimensional frame structure.

13. The method of claim 1, wherein attachment of the cover layers to extremes of a respective side of the three dimensional frame structure takes place with one-side sewing.

14. A method for manufacturing a core structure of an aircraft comprising a structural component in a sandwich construction, comprising the steps of:

producing a two dimensional lattice structure from bar-shaped linear semi finished products intersecting at defined points of intersection;

connecting the bar-shaped linear semi finished products at the defined points of intersection;

softening the bar-shaped linear semi finished products by locally applying heat to the two dimensional lattice structure along each of three non-intersecting straight lines; and introducing a force into the two dimensional lattice structure along a middle one of the three non-intersecting straight lines to which heat is applied, wherein as a result of deformation of the two dimensional lattice structure, the force is deflected into pairs of tensile forces acting in the bar-shaped linear semi finished products, as a result of which the two dimensional lattice structure is pulled into a third dimension, along the middle line of the straight lines to which heat is applied.

* * * * *